US 007917887B2

(12) United States Patent
Provine

(10) Patent No.: US 7,917,887 B2
(45) Date of Patent: Mar. 29, 2011

(54) DDEX (DATA DESIGNER EXTENSIBILITY) DEFAULT OBJECT IMPLEMENTATIONS FOR SOFTWARE DEVELOPMENT PROCESSES

(75) Inventor: Stephen Wharton Provine, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 933 days.

(21) Appl. No.: 11/770,403

(22) Filed: Jun. 28, 2007

(65) Prior Publication Data

US 2009/0006446 A1    Jan. 1, 2009

(51) Int. Cl.
*G06F 9/44* (2006.01)
*G06F 9/445* (2006.01)

(52) U.S. Cl. .................... 717/100; 717/101; 717/120

(58) Field of Classification Search .......... 717/100–104, 717/120–123, 113–116
See application file for complete search history.

(56) References Cited

U.S. PATENT DOCUMENTS

| | | | |
|---|---|---|---|
| 5,430,873 A * | 7/1995 | Abe et al. ...................... 717/113 |
| 5,583,988 A | 12/1996 | Crank |
| 5,898,871 A | 4/1999 | Williamson et al. |
| 5,987,247 A | 11/1999 | Lau |
| 6,032,152 A | 2/2000 | Pearson |
| 6,158,044 A * | 12/2000 | Tibbetts ........................ 717/100 |
| 6,292,937 B1 | 9/2001 | Sakata |
| 6,336,217 B1 | 1/2002 | D'Anjou |
| 6,343,265 B1 * | 1/2002 | Glebov et al. .................... 703/25 |
| 6,397,384 B1 | 5/2002 | Briggs |
| 6,463,480 B2 | 10/2002 | Kikuchi |
| 6,480,856 B1 | 11/2002 | McDonald |
| 6,523,934 B1 | 2/2003 | Beauchamp |
| 6,662,357 B1 * | 12/2003 | Bowman-Amuah .......... 717/120 |
| 6,704,803 B2 | 3/2004 | Wilson et al. |
| 6,788,317 B2 | 9/2004 | Gardas et al. |
| 6,826,600 B1 | 11/2004 | Russell |
| 6,915,507 B1 * | 7/2005 | Kaler et al. .................... 717/103 |
| 6,922,200 B1 | 7/2005 | Marques |
| 6,922,824 B2 | 7/2005 | Swetland |
| 6,996,832 B2 | 2/2006 | Gunduc et al. |
| 7,047,518 B2 | 5/2006 | Little et al. |
| 7,131,112 B1 * | 10/2006 | Bartz et al. .................... 717/122 |
| 7,139,999 B2 * | 11/2006 | Bowman-Amuah .......... 717/101 |
| 7,152,223 B1 | 12/2006 | Brumme et al. |
| 7,200,530 B2 | 4/2007 | Brown et al. |
| 7,287,037 B2 * | 10/2007 | An et al. ............................... 1/1 |
| 7,290,243 B1 * | 10/2007 | Bertelrud et al. ............. 717/107 |
| 7,293,267 B1 | 11/2007 | Fresko |
| 7,305,652 B2 * | 12/2007 | Davis et al. .................... 717/100 |
| 7,380,237 B2 | 5/2008 | Goring |
| 7,434,203 B2 * | 10/2008 | Stienhans et al. ............. 717/120 |

(Continued)

OTHER PUBLICATIONS

Baloukas et al, "Component based library implemenation of abstract data types for resource management customization of embedded systems", IEEE, 99-104, 2007.*

(Continued)

*Primary Examiner* — Anil Khatri
(74) *Attorney, Agent, or Firm* — Workman Nydegger

(57) ABSTRACT

A system and method for providing DDEX (data designer extensibility) default object implementations by bundling information associated with a support entity and information required to instantiate a new default instance is provided. Metadata associated with the definition of the support entity indicates if a default implementation exists and includes information associated with the creation of the default implementation. The metadata of the support entity is analyzed to automatically create and return a default implementation if the provider does not supply a specific implementation.

14 Claims, 10 Drawing Sheets

U.S. PATENT DOCUMENTS

| | | | | |
|---|---|---|---|---|
| 7,467,373 | B2 | 12/2008 | Pepin | |
| 7,512,929 | B2* | 3/2009 | Sangal et al. | 717/100 |
| 7,519,947 | B2* | 4/2009 | Shukla et al. | 717/113 |
| 7,565,643 | B1* | 7/2009 | Sweet et al. | 717/121 |
| 7,603,191 | B2* | 10/2009 | Gross | 700/97 |
| 7,673,286 | B2* | 3/2010 | Yuknewicz et al. | 717/113 |
| 7,707,549 | B2* | 4/2010 | Chudukatil et al. | 717/120 |
| 7,752,606 | B2* | 7/2010 | Savage | 717/135 |
| 7,770,159 | B2* | 8/2010 | Pepin et al. | 717/138 |
| 2001/0056457 | A1 | 12/2001 | Kikuchi | |
| 2002/0073396 | A1 | 6/2002 | Crupi | |
| 2002/0198858 | A1 | 12/2002 | Stanley | |
| 2003/0101291 | A1 | 5/2003 | Mussack et al. | |
| 2003/0121024 | A1 | 6/2003 | Hill | |
| 2003/0126310 | A1 | 7/2003 | Ryzhov | |
| 2003/0163603 | A1 | 8/2003 | Fry | |
| 2003/0237079 | A1 | 12/2003 | Aggarwal | |
| 2004/0010776 | A1 | 1/2004 | Shah | |
| 2004/0015817 | A1 | 1/2004 | Kress | |
| 2004/0015890 | A1 | 1/2004 | Wong | |
| 2004/0025083 | A1 | 2/2004 | Nanja | |
| 2004/0268309 | A1 | 12/2004 | Grover | |
| 2005/0114848 | A1 | 5/2005 | Choi | |
| 2005/0138623 | A1 | 6/2005 | Fresko | |
| 2005/0144606 | A1 | 6/2005 | Li | |
| 2005/0278339 | A1 | 12/2005 | Petev | |
| 2005/0289166 | A1 | 12/2005 | Stanley | |
| 2006/0048103 | A1 | 3/2006 | Archambault | |
| 2006/0085342 | A1 | 4/2006 | Chen et al. | |
| 2006/0156317 | A1 | 7/2006 | McCain et al. | |

OTHER PUBLICATIONS

Mora et al, "Physical modeling of data warehouses using UML", ACM DOLAP, pp. 48-57, 2004.*

Joslin et al, "Modelling quest data for game designers", ACM, pp. 184-190, 2006.*

Petropoulos et al, "Graphical query interfaces for semistructured data: The QURSED system", ACM Trans. on Internet Tech., vol. 5, No. 2, pp. 390-438, 2005.*

Microsoft Corporation, Microsoft.VisualStudio.Data.AdoDotNet Namespace, http://msdn2.microsoft.com/en-us/library/microsoft.visualstudio.data.adodotnet(VS.80).aspx, Last Accessed on Jun. 28, 2007, 1 page.

Microsoft Corporation, Registering a DDEX Provider Specialized for ODBC, http://msdn2.microsoft.com/en-us/library/bb163974(VS.80).aspx, Last Accessed on Jun. 28, 2007, 2 Pages.

System Namespace, http://msdn.microsoft.com/library/default.asp?url=/library/en-us/cpref/html/frlrfsystem.asp, 8 Pages, Last Viewed on Jul. 13, 2005.

ITypeInfo Interface, http://msdn.microsoft.com/library/default.asp?url=/library/wn-us/automat/htm/chap9__24k1.asp, 1 Page, Last Viewed on Jul. 13, 2005.

Hansen, G.A., Simulating Software Development Process, IEEE, vol. 29, Issue 1, Jan. 1996, pp. 73-77.

Boldyreff, C., Newman, J., Taramaa, J., Managing Process improvement in Virtual Software Corporations, IEEE, Jun. 1996, pp. 142-147.

Bennett, T., Wennberg, P., Maintaining Verification Test Consistency Between Executable Specifications and Embedded Software in a Virtual System Integration Laboratory Environement, IEEE, Dec. 2003, pp. 221-228.

Yonemoto, S., Taniguchi, R., Human Figure Contol Software for Real-Virtual Application, IEEE, Jul. 14-16, 2004, pp. 858-862.

Matthew Fuchs, Object Oriented Programming Using XSD and XSLT, Dec. 7-12, 2003, XML Conference & Exposition 2003, pp. 1-12.

Hericko, et al., Object Serialization Analysis and Comparison in Java and .NET, Aug. 2003, ACM Sigplan Notices, vol. 38, Issue 8, pp. 44-54.

Gordon, et al., Validating a Web Service Security Abstraction by Typing, No. 2002, ACM, XMLSEC, pp. 18-29.

U.S. Appl. No. 10/970,415, Jul. 5, 2007, Office Action.
U.S. Appl. No. 10/970,415, Jan. 11, 2008, Office Action.
U.S. Appl. No. 10/970,415, Jul. 23, 2008, Office Action.
U.S. Appl. No. 10/970,415, Mar. 6, 2009, Office Action.
U.S. Appl. No. 10/967,724, Aug. 13, 2007, Office Action.
U.S. Appl. No. 10/967,724, Feb. 5, 2008, Office Action.
U.S. Appl. No. 10/967,724, Aug. 20, 2008, Notice of Allowance.
U.S. Appl. No. 10/970,415, Mar. 12, 2010, Notice of Allowance.

* cited by examiner

DDEX (DATA DESIGNER EXTENSIBILITY) DEFAULT OBJECT IMPLEMENTATIONS FOR SOFTWARE DEVELOPMENT PROCESSES

BACKGROUND

Data Designer Extensibility (DDEX) allows software development tools to produce applications that interact with third party data sources. DDEX technology allows data providers to integrate with a software application development tool that is employed by programmers to create standalone applications, web sites, web applications, and/or web services.

A DDEX provider represents third party extensibility for data design time support and implements one or more support entities that represent contracts understood by code running in a software development tool. Support entities define different methods, with different parameters and specific types that have specific behaviors and implementations. A third party employs these method definitions and provides variants for a particular data source.

The implementation supplied by the provider represents the correct set of actions that can be performed for a given contract when designing against a particular data source. Since each data source has different characteristics, both syntactical and structural, they require a data source-specific DDEX provider. For example, supporting design-time operations against a relational database is different as compared to supporting operations against a proprietary database, or against a spreadsheet application, or against a CVS (comma-separated values) or XML (Extensible Markup Language) file and would require a different data provider.

The support entities cannot function without a provider's implementation. In conventional systems, client code that is trying to retrieve an implementation of a support entity from a provider would contain logic that determines a default implementation for each support entity. The client provided implementation would be employed if a provider does not supply a specific implementation. Thus, the client requires knowledge, then, of where and how to instantiate these various default implementations for every support entity in order to avoid an error when a provider fails to supply a specific implementation for a particular support entity. Furthermore, contracts can be defined by third parties or coded in the software development tool. Thus, it is difficult for a client employing one of these contracts to know what its default behavior should be.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

The system disclosed and claimed herein, in one aspect thereof, provides DDEX (data designer extensibility) default object implementations by bundling information associated with a support entity wherein the information is employed to instantiate a new default instance. The system determines the default implementation employing the information associated with the support entity and returns it to a client when a provider does not supply a specific implementation for the support entity. A support entity represents contracts understood by code running in a software development program. The implementation for a support entity represents the correct set of actions that can be executed for a given contract when designing against a particular data source.

Another aspect of the system relates to inclusion of a description of whether there is a default implementation, and if so, how to create it, in the definition of the support entity. In accordance with this embodiment, clients no longer need to contain special logic surrounding default implementations. Instead, the metadata of the support entity that clients reference to create provider support entities is inspected and a default implementation is automatically created and returned to the client if the provider did not supply an implementation.

Yet another aspect of the system relates to a DDEX (data designer extensibility) component that typically includes a support entity creation component. The support entity creation component defines a support entity along with metadata associated with the default implementation of the support entity. Generally, the metadata includes information about whether a support entity has a default implementation and information required to instantiate a new default instance, as well as exactly what this information is and how it is employed to instantiate a new default instance.

According to an aspect of the system, an implementation retrieval component is employed to obtain an implementation for a support entity from a third party provider while designing against a particular data source. The implementation retrieval component queries the provider to supply an implementation for the support entity and analyses the response sent by the provider. If a provider responds with an implementation, the implementation supplied is employed else a default implementation is employed to avoid error conditions.

According to yet another aspect of the system, a default implementation creating component analyzes the metadata associated with a support entity to determine a default implementation. The metadata typically includes an attribute that denotes whether or not the support entity has a default implementation. An identifier associated with the attribute specifies a uniquely recognizable value that represents a lookup of a specific implementation of this interface that is the default implementation.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
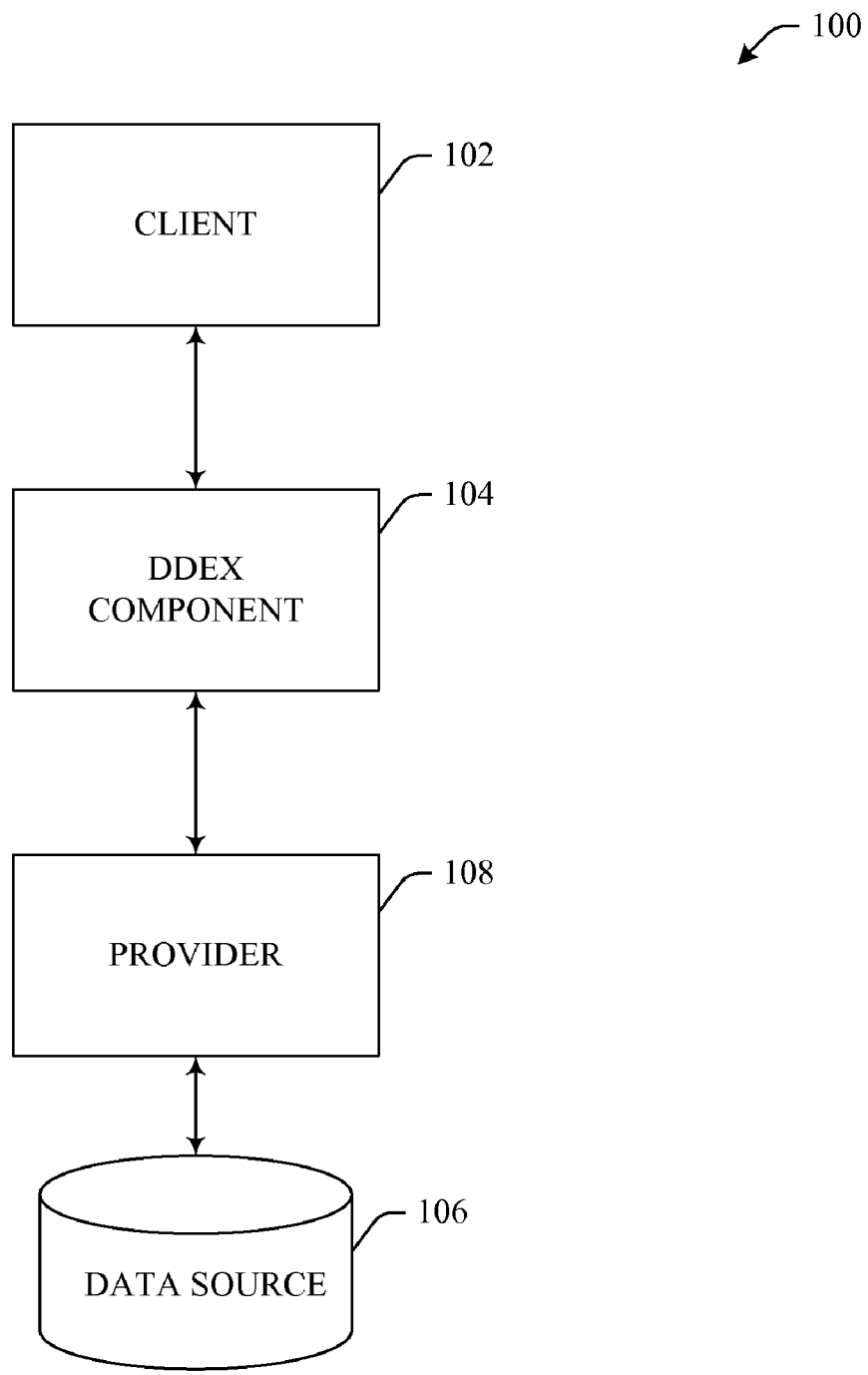
FIG. 1 illustrates a block diagram of an exemplary system that provides DDEX (data designer extensibility) default object implementations to a client.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "support entity" and "contract" are generally used interchangeably herein and relate to an interface that defines various properties, methods and events that classes can implement.

Referring initially to FIG. 1, there illustrated is a system 100 that provides DDEX (data designer extensibility) default object implementations to a client 102. The client 102 can run code that can employ an implementation of a support entity. As discussed above, a support entity represent contracts understood by code running on the client 102. A DDEX component 104 can be employed to determine the implementation of the required support entity. The DDEX component 104 can define a systematic approach to extending data designers and data-related features of a software development program to enable scenarios provided by third party data sources 106. This can provide design-time access to external data source objects.

The DDEX component 104 can be employed to define a support entity in a manner such that it includes information associated with the default implementation of the support entity. The information can include, but is not limited to, information that determines whether the support entity has a default implementation or not as well as information required to instantiate a default implementation.

The DDEX component 104 can further be employed to retrieve an implementation from a provider 108. The DDEX component 104 can query the provider 108 to determine a provider-specific implementation for a support entity. The provider 108 can return a provider-specific implementation that represents a set of actions that can be performed for a given support entity when designing against a particular data source 106.

If the provider 108 supplies a specific implementation, the DDEX component 104 can return the implementation to the client 102. However, if the provider does not supply an implementation, the DDEX component 104 can create a default implementation for the support entity and provide the client 102 with the default implementation.

Figure 2:
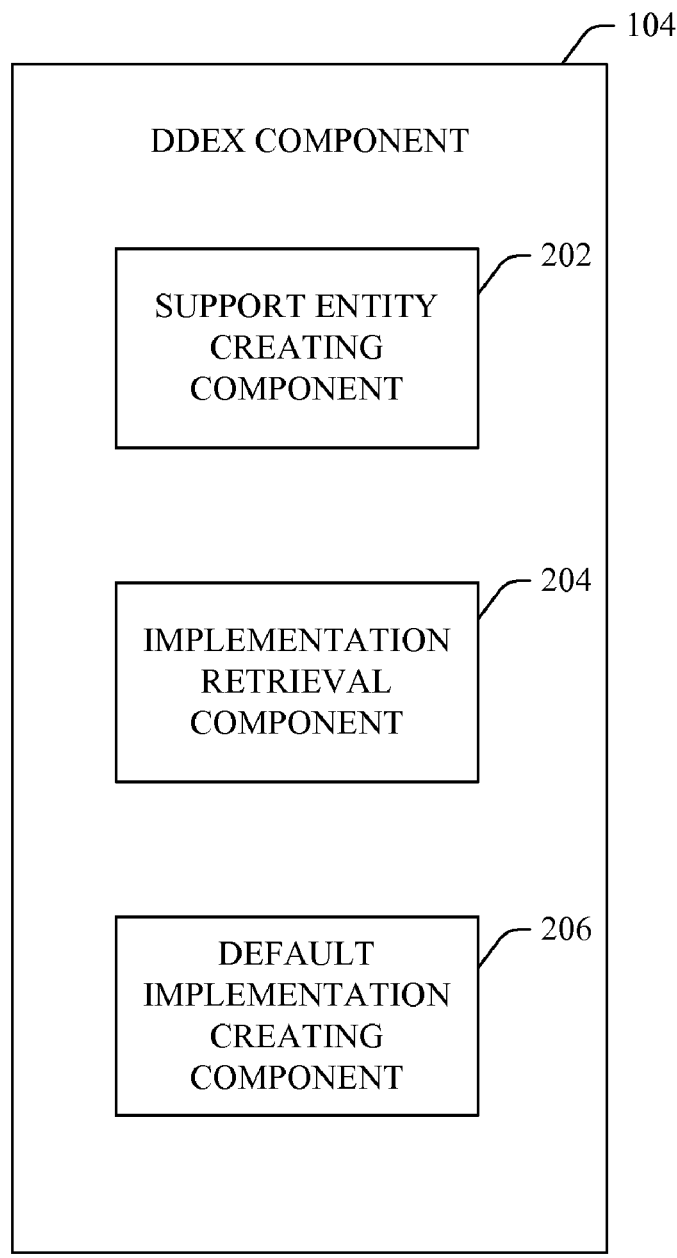
FIG. 2 illustrates an exemplary system that creates support entities such that a default implementation of a given support entity can be determined based on the metadata associated with the support entity.

Referring now to FIG. 2, there illustrated is a DDEX component 104 in accordance with an aspect of the specification. The DDEX component 104 enables a third party data source (not shown) to participate fully in the design-time experience.

The DDEX component 104 can provide a client (not shown) with a specific implementation for a support entity against a particular data source.

Typically, the DDEX component 104 can include a support entity creating component 202. The support entity creating component 202 can define a support entity wherein the definition can include, but is not limited to, a description of whether there is a default implementation for the support entity, and if so, how to create it. Thus, the support entity creating component 202 can define the support entity and attach metadata along with the definition.

The DDEX component 104 can further include an implementation retrieval component 204. The implementation retrieval component 204 can query a provider and determine if the provider supports the particular entity. If the provider supports the entity, an instance can be created and returned. A client can employ the provider-specified instance and design against a particular data source. However, in certain cases, the provider may not supply an implementation for the support entity. In such a case, a default implementation creating component 206 can be employed to create a default instance and return it to a client.

The default implementation creating component 206 can analyze the metadata associated with the particular support entity and determine a default implementation based on the metadata. If the metadata indicates that a default implementation for the support entity does not exist, the default implementation creating component 206 can either throw an exception or return a null value, depending on the code path. If the metadata indicates a default implementation exists, the default implementation creating component 206 can automatically create and return a default implementation thus avoiding special logic surrounding default implementations to be contained by a client.

Figure 3:
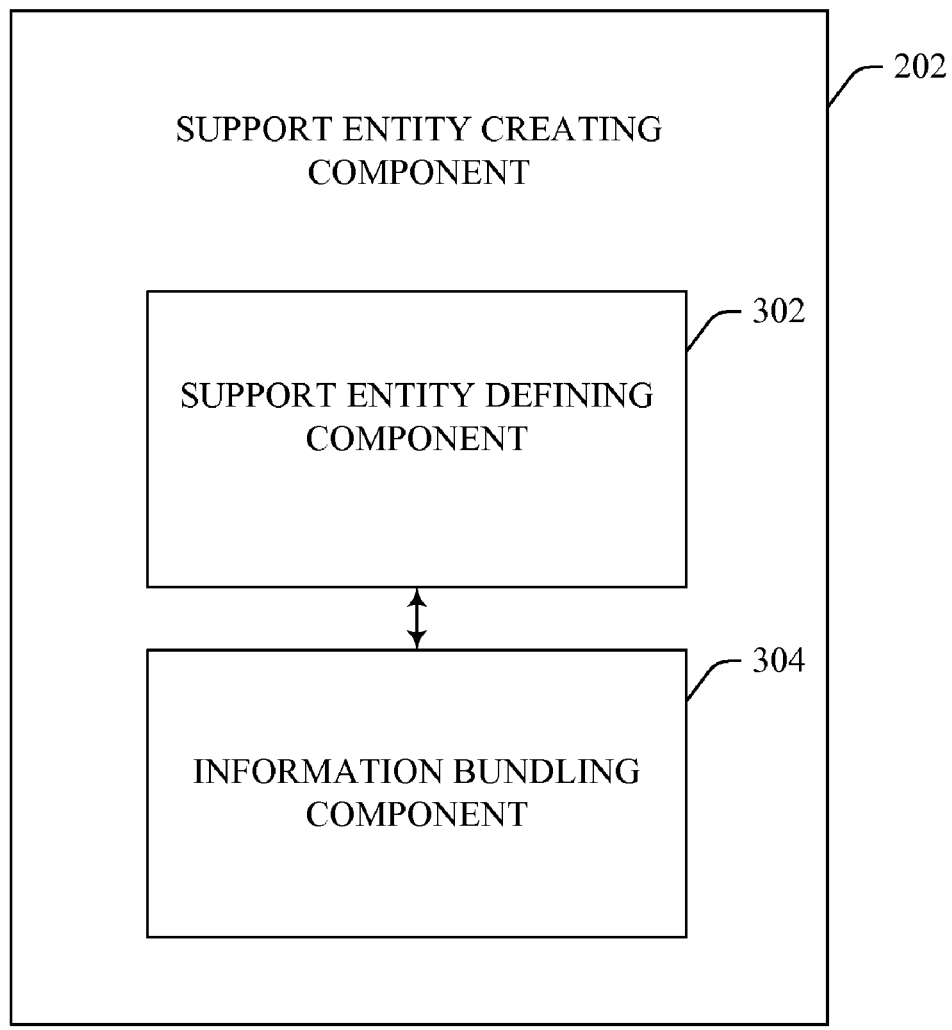
FIG. 3 illustrates a block diagram of an exemplary system that defines a support entity along with metadata associated with the default implementation of the support entity, in accordance with an aspect of the specification.

FIG. 3 illustrates a block diagram of an exemplary support entity creating component 202 that defines a support entity along with metadata associated with the default implementation of the support entity, in accordance with an aspect of the specification. Typically, the support entity creating component 202 can include a support entity defining component 302 and an information bundling component 304.

The support entity defining component 302 can be employed to define a support entity. Support entities can be represented by interfaces that represent well known contracts between a client (caller of the interface) and the implementation (callee of the interface). The interface can provide definitions of various methods that have a specific behavior and parameters associated with the methods.

As an example, the interface below can be employed to perform two tasks namely, ThisTask and ThisOtherTask.

```
Interface IMySupportEntity
{
    Integer DoThisTask( );
    String DoThisOtherTask(String input);
}
```

The support entity defining component 302 can define tasks that can be performed by a support entity and can also define the input and output parameters associated with the tasks. In the above example, the first task (ThisTask) does not have an input but returns an Integer value and the second task (ThisOtherTask) defines a String input and returns a String value as an output. It can be appreciated that most any data type can be defined as an input or output parameter. The definition of the support entity can enable a client to understand how to call the two tasks described above. However, a specific implementation is employed to carry out the required actions to properly execute the tasks.

If a provider fails to supply a specific implementation, a default implementation can be employed to execute the tasks. The information bundling component 304 can be employed to attach metadata associated with a default implementation to the definition of the support entity. The metadata can include, but is not limited to, information about whether a support entity has a default implementation and information required to instantiate a new default instance.

The metadata can include an attribute that indicates existence of a default implementation for the support entity. For example, an attribute such as [DataDefaultObject ("<identifier>")] is attached to the definition of the support entity as shown below.

```
[DataDefaultObject("<identifier>")]
Interface IMySupportEntity
{
    Integer DoThisTask( );
    String DoThisOtherTask(String input);
}
```

The existence of an attribute can denote whether or not the support entity has a default implementation. The "<identifier>" associated with the attribute can specify a uniquely recognizable value that can represent a lookup of a specific implementation of this interface that is the default implementation. Typically, the attribute can include, but is not limited to, a valid GUID (Globally unique identifier), that can identify a type that implements an interface (e.g. a .NET class), registered with the software development program. It can be appreciated that the syntax of the metadata associated with the default implementation can be specific to a software application development tool.

Figure 4:
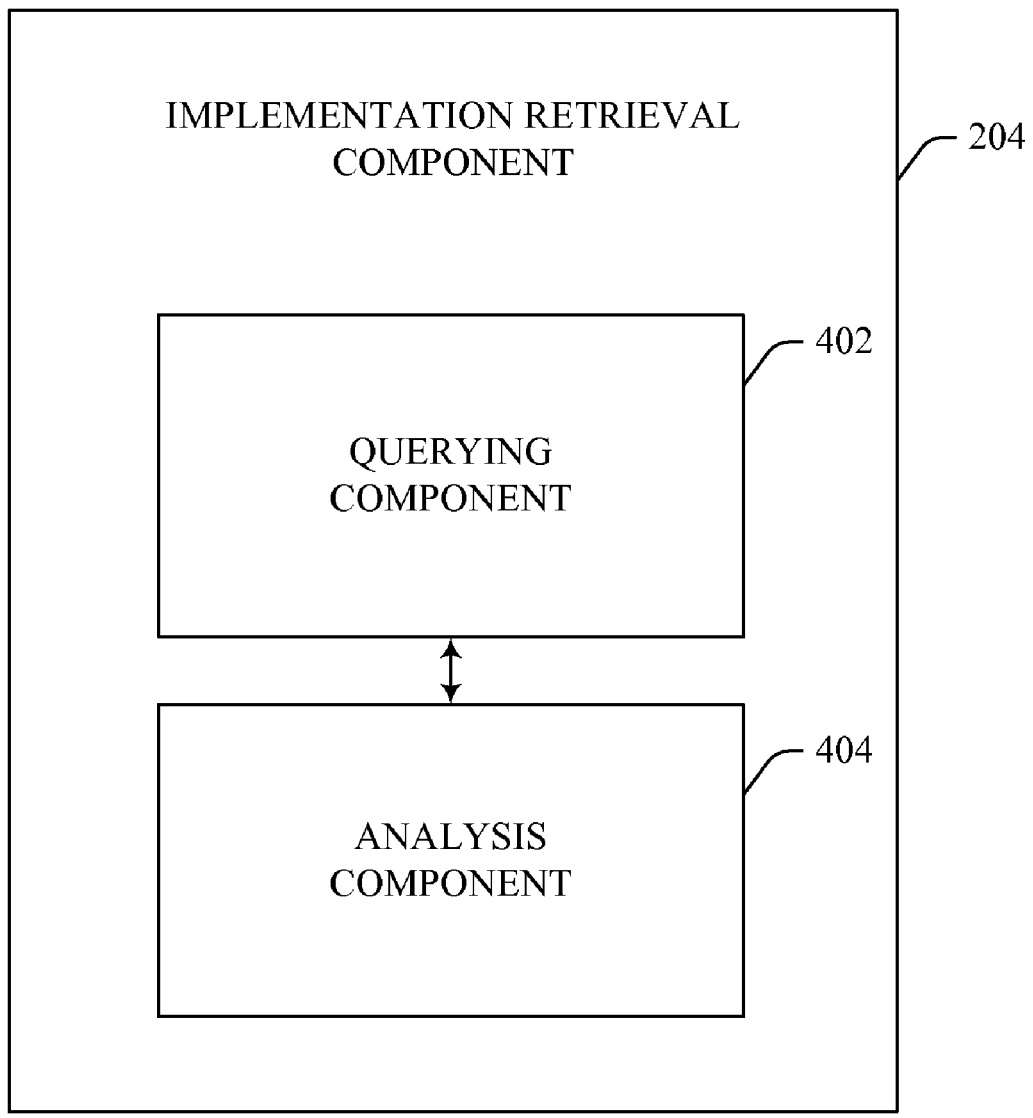
FIG. 4 illustrates a block diagram of an exemplary system that retrieves an implementation for a particular support entity from a third party provider according to an aspect of the specification.

Referring now to FIG. 4, there illustrated is an exemplary implementation retrieval component 204 that retrieves an implementation for a particular support entity from a third party provider according to an aspect of the specification. A client can employ the implementation retrieval component 204 to create an instance of a support entity for a particular provider.

The implementation retrieval component 204 can include a querying component 402 that can request one or more providers to supply an implementation for a particular support entity. If the provider supports the particular support entity, the querying component 402 can retrieve a specific implementation for the entity supplied by the provider.

An analysis component 404 can be employed to analyze the response returned by a third party provider to the request sent by the querying component 402. If the response includes a specific implementation, the specific implementation can be employed to create an instance for a client. If the response does not include an implementation, the analysis component 404 can determine if a default implementation exists for the particular support entity.

Figure 5:
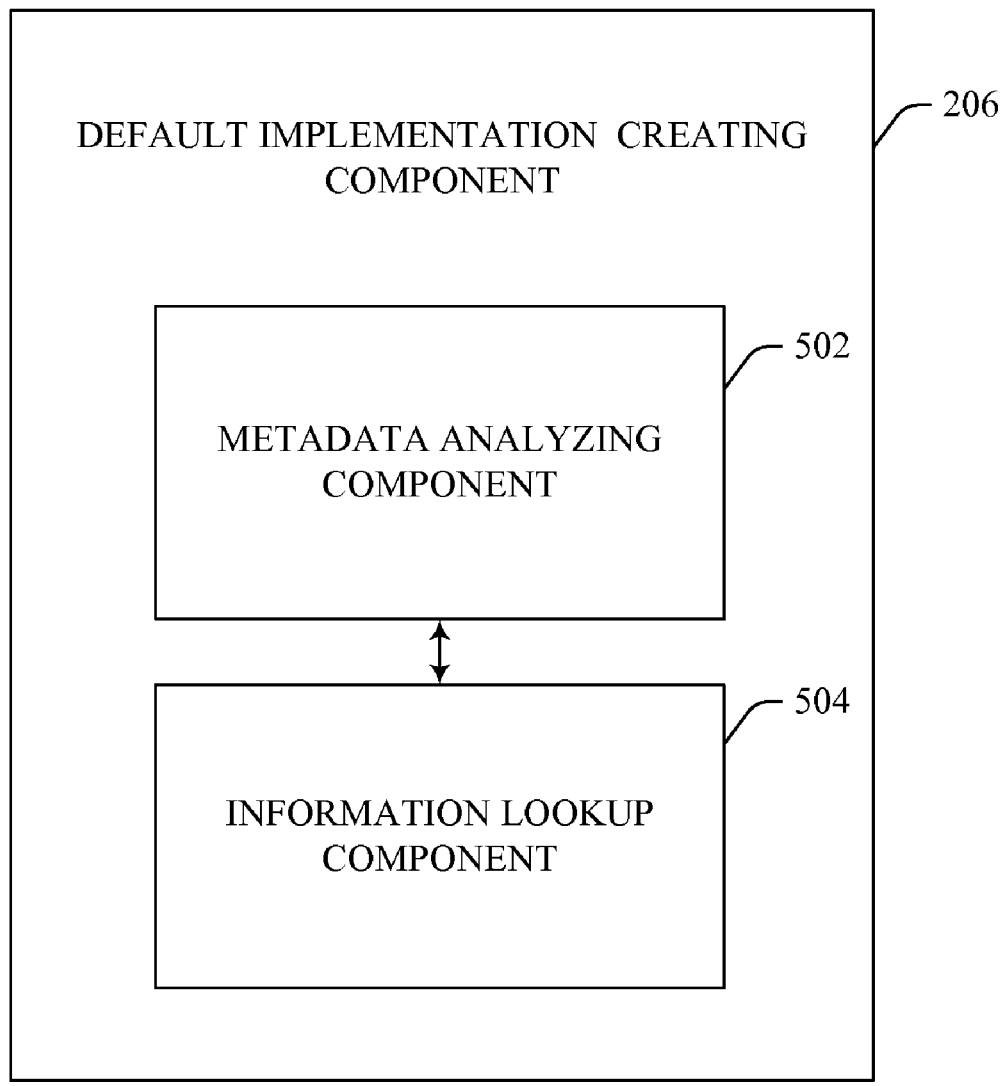
FIG. 5 illustrates a block diagram of an exemplary system that determines a default implementation for a support entity by analyzing the metadata associated with the support entity according to an aspect of the specification.

FIG. 5 illustrates an exemplary default implementation creating component 206 that can be employed to create a default implementation of a support entity when a provider does not supply a specific implementation according to an aspect of the specification. Typically, a metadata analyzing component 502 can be employed to determine whether the support entity has a default implementation based on analysis of the information associated with the support entity. The metadata analyzing component 502 can analyze the metadata associated with the support entity and can determine if the metadata includes an attribute related to a default implementation. The existence of an attribute indicates that the support entity has a defined default implementation that can be employed to create an instance for a client. Furthermore, the metadata analyzing component 502 can determine an identifier associated with the attribute.

An information lookup component 504 can be employed to instantiate a default instance by employing the identifier included in the metadata of the support entity. The identifier associated with the attribute can specify a uniquely recognizable value, for example, a GUID, that represents a lookup of a specific implementation of the support entity. The specific implementation looked up by the value obtained from the identifier can be employed as the default implementation of the support entity.

Figure 6:
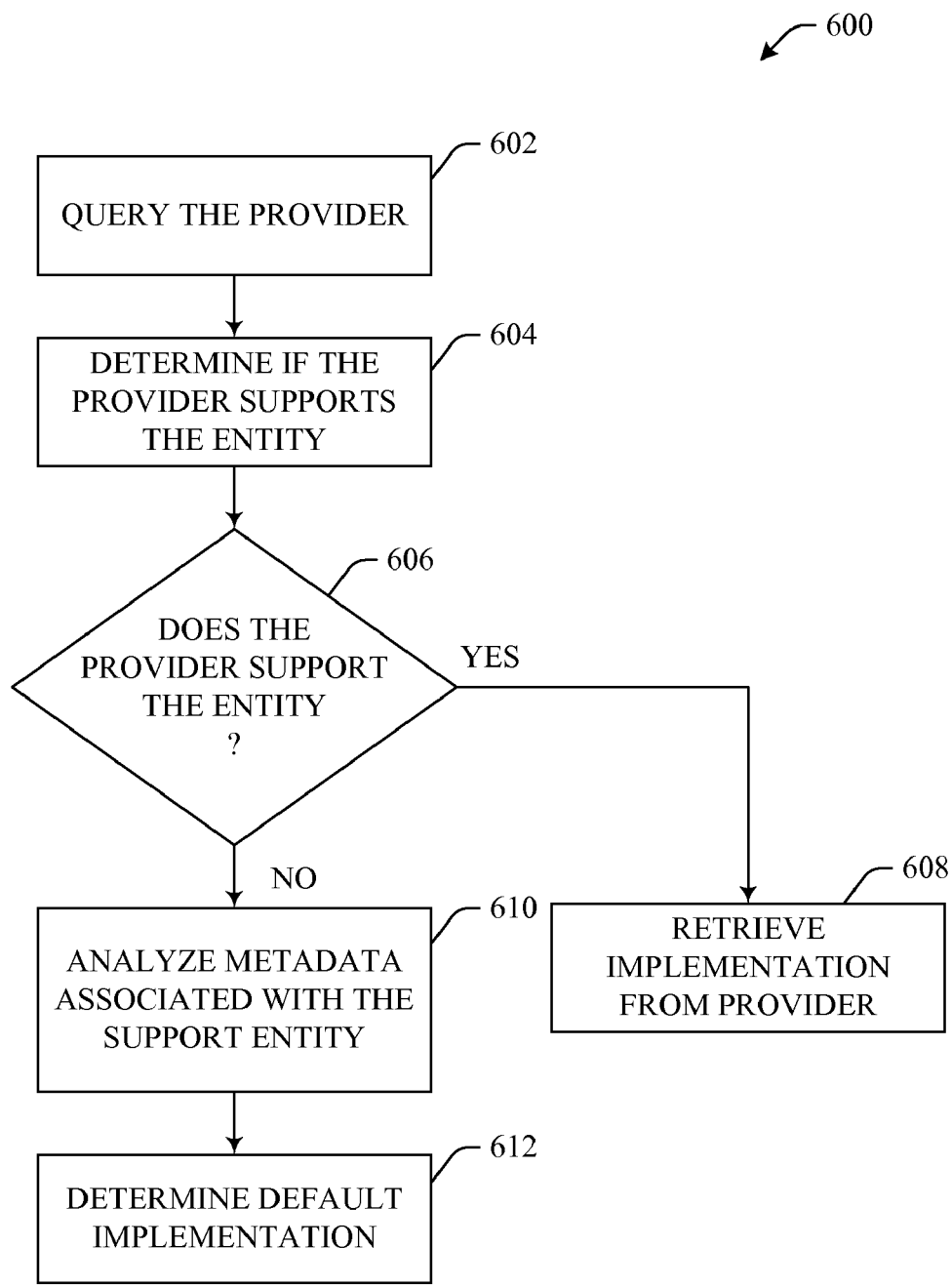
FIG. 6 illustrates an exemplary flow chart of procedures that facilitates determination of an implementation for a support entity from a third party provider, in accordance with an aspect of the specification.

FIG. 6 illustrates a methodology that can determine an implementation for a particular support entity from a third party provider, in accordance with an aspect of the specification. While, for purposes of simplicity of explanation, the one or more methodologies shown herein, e.g., in the form of a flow chart, are shown and described as a series of acts, it is to be understood and appreciated that the subject specification is not limited by the order of acts, as some acts may, in accordance with the specification, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the specification.

Referring back to FIG. 6, a third party provider can be queried at 602 to determine if the provider can support a particular support entity employed by a client. It can be appreciated, that more than one provider can be queried to determine which of the providers supports the entity. A determination can be made based on the response from the provider at 604 and a provider that supports the particular support entity can be identified. As shown by the decision box 606, it can be determined whether the identified provider supports the entity. If the provider supports the particular entity, a provider-specific implementation can be retrieved from the provider at 608. The provider-specific implementation can be employed to instantiate an instance for the support entity that can be returned to the client.

If the provider does not support the entity, the metadata associated with the entity can be analyzed at 610. An attribute included in the metadata can provide information relating to the creation of a default implementation for the support entity. The default implementation can be determined based on the information at 612 and can be employed to create a default instance of the support entity that can be returned to a client.

For example, a support entity that enables asynchronous execution of commands on a data source can be defined. A default implementation of the support entity can have a reasonable implementation of the complicated threading and event requirements for asynchronous calls, and can eventually delegate to the synchronous execution of commands. A provider can be queried for a provider-specific implementation of asynchronous commands and it can be determined if the provider supports this functionality. If the provider supports the functionality, a relevant object is created and returned to a client. However, if the provider does not support the functionality, the information, associated with the object, representing a default implementation is identified and employed to instantiate a default instance automatically.

Another example is a support entity that contains a single method to open a data connection from a UI (User Interface) context such as a data connection dialog. Typically, this support entity is employed to add additional behavior such as checking for the existence of the data connection target and prompting to create a new data store if it was not found. However, a perfectly reasonable default can be to simply open the connection normally without doing anything special. This default implementation can be determined from the metadata associated with the support entity such that client code is simplified, as it no longer needs to separately handle the cases where the provider does or does not implement this support entity, nor does it need to come up with its own fallback, default implementation.

Figure 7:
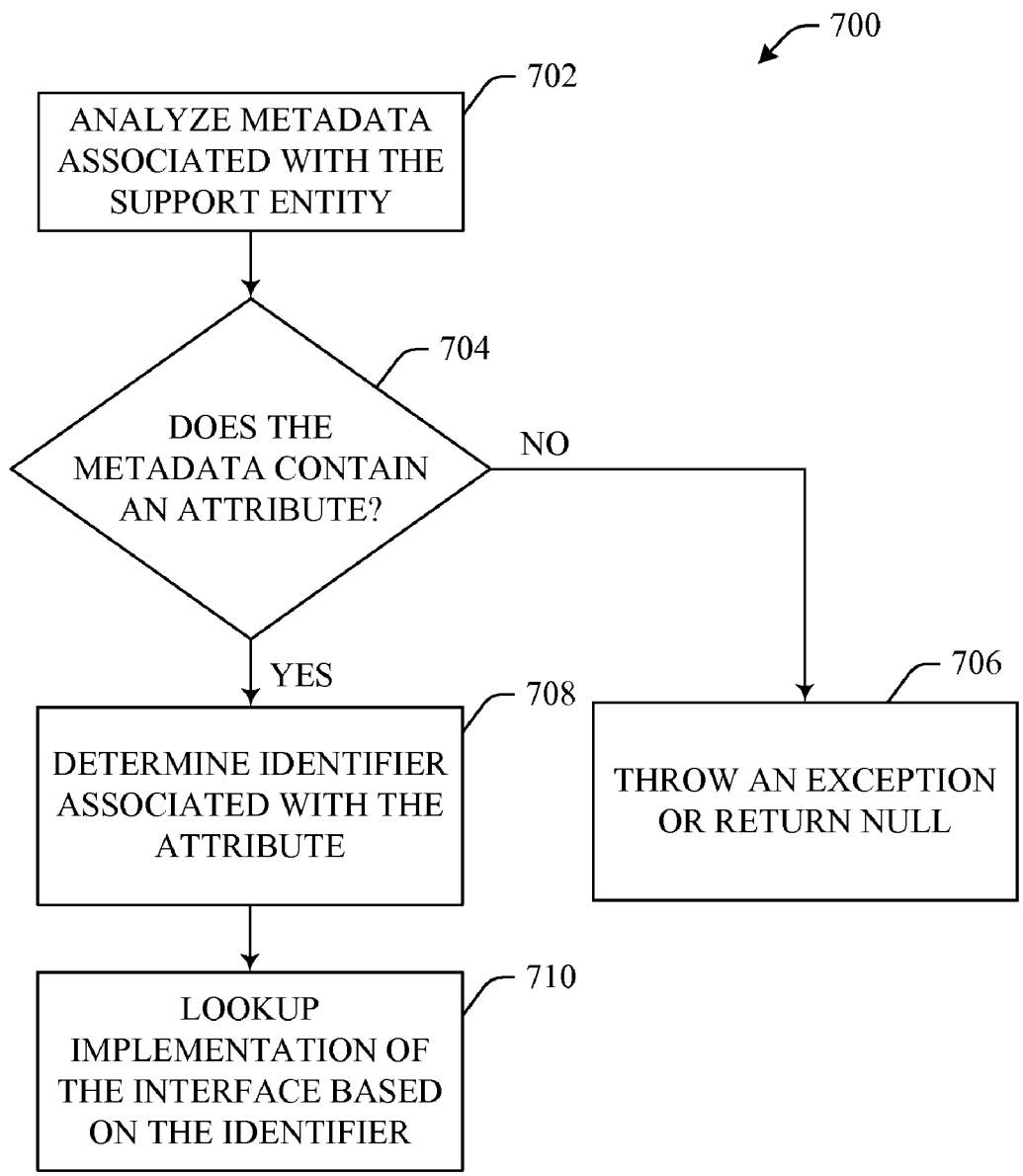
FIG. 7 illustrates an exemplary flow chart of procedures that facilitates determination of a default implementation based on analysis of metadata associated with a support entity according to an aspect of the specification.

Referring now to FIG. 7, there illustrated is a methodology that can determine a default implementation based on analysis of metadata associated with a support entity according to an aspect of the specification. If a provider does not supply an implementation for a support entity, a default implementation can be created by employing the metadata associated with the support entity.

The metadata associated with the support entity can be analyzed at 702 when a provider fails to supply a specific implementation. As shown by the decision box 704, it can be determined if the metadata includes an attribute that relates to the default implementation for the support entity. If the metadata does not include an attribute, an exception can be thrown and/or a null value can be returned at 706.

If the metadata includes an attribute, it can be determined that the support entity has a pre-defined default implementation. An identifier associated with the attribute can be determined at 708. The identifier (e.g. a GUID) can specify a uniquely recognizable value. This value can be employed to lookup a default implementation of the support entity at 710. The default implementation can be employed to instantiate an instance that can be returned to a client.

Figure 8:
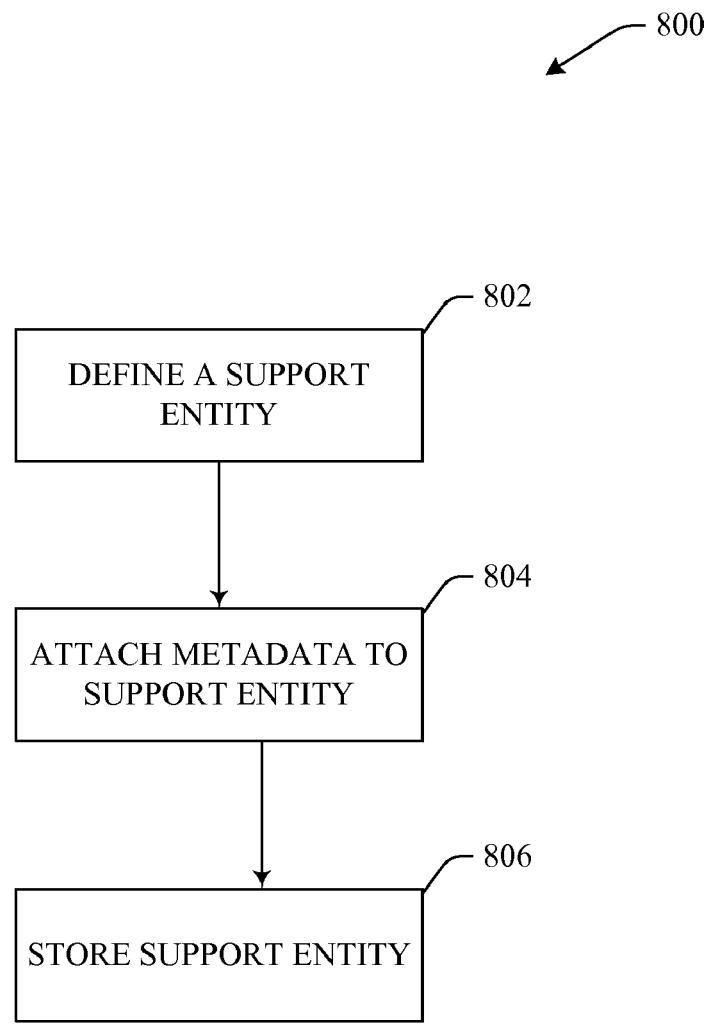
FIG. 8 illustrates an exemplary flow chart of procedures that facilitates defining a support entity along with metadata associated with the default implementation of the support entity, in accordance with an aspect of the specification.

FIG. 8 illustrates a methodology that can define a support entity along with metadata associated with the default implementation of the support entity, in accordance with an aspect of the specification. A support entity can be defined at 802. The definition can include one or more methods and the input and output parameters associated with the method. For example,

```
Interface NameSupportEntity
{
    <Datatype> Task1(<Datatype> input);
    <Datatype> Task2(<Datatype>  input);
    .
    .
    <Datatype> Task N(<Datatype>  input);
}
```

The above example represents a definition for a support entity. The support entity can include a number of methods, namely, Task1-TaskN (where N is a natural number from 1 to infinity). The data types associated with the input and output of each method can be defined as shown above.

Metadata associated with a default implementation of the support entity can be attached to its definition at 804. The metadata can include an attribute that denotes the existence of a default implementation for the support entity. An identifier associated with the attribute specifies a uniquely recognizable value that represents the lookup of a default implementation.

For example, the attribute [DataDefaultObject ("<identifier>")], can be attached to the definition of the support entity, wherein the "<identifier>" can be employed to determine a default implementation for the support entity. The support entity along with the metadata associated with its default implementation can be stored at 806.

As an example, support entities that have a reasonable default implementation can include an attribute on the type representing the support entity. The attribute can include a value that can be a valid GUID representing a class identifier (ID) registered in the software development environment. Furthermore, the class identified by the class ID can be a managed class that implements the interface. When requested by a client, an instance of the class with the specified class ID can be created if no provider implementation is available. The default implementation can then be passed back to the client.

Figure 9:
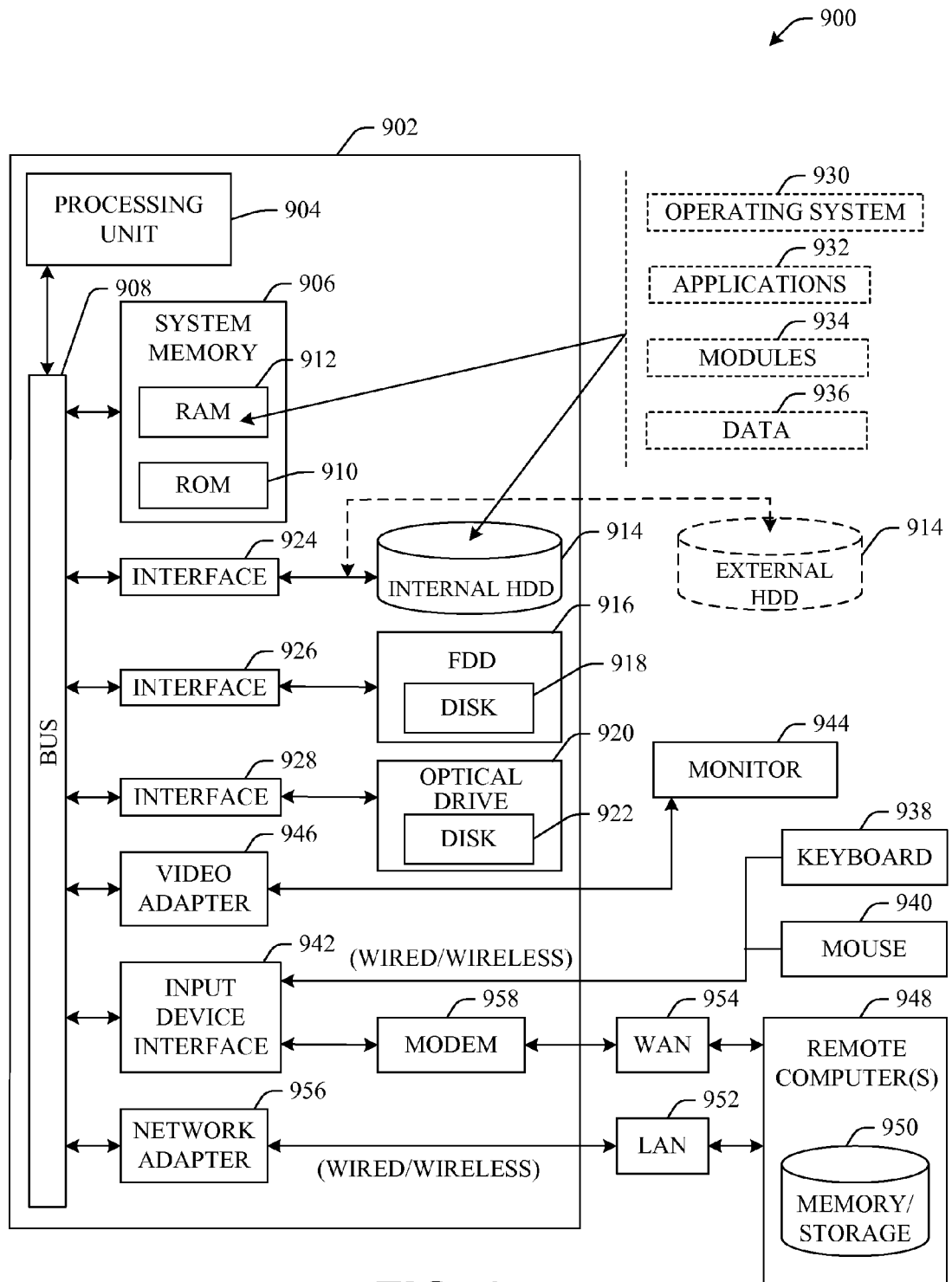
FIG. 9 illustrates a block diagram of a computer operable to execute the disclosed architecture.

Referring now to FIG. 9, there is illustrated a block diagram of a computer operable to execute the disclosed architecture for the system that provides DDEX default object implementations by bundling information associated with a support entity and information required to instantiate a new default instance. In order to provide additional context for various aspects of the subject specification, FIG. 9 and the following discussion are intended to provide a brief, general description of a suitable computing environment 900 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the example environment 900 for implementing various aspects of the specification includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 994 interface technologies. Other external drive connection technologies are within contemplation of the subject specification.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the specification can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 994 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are example and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
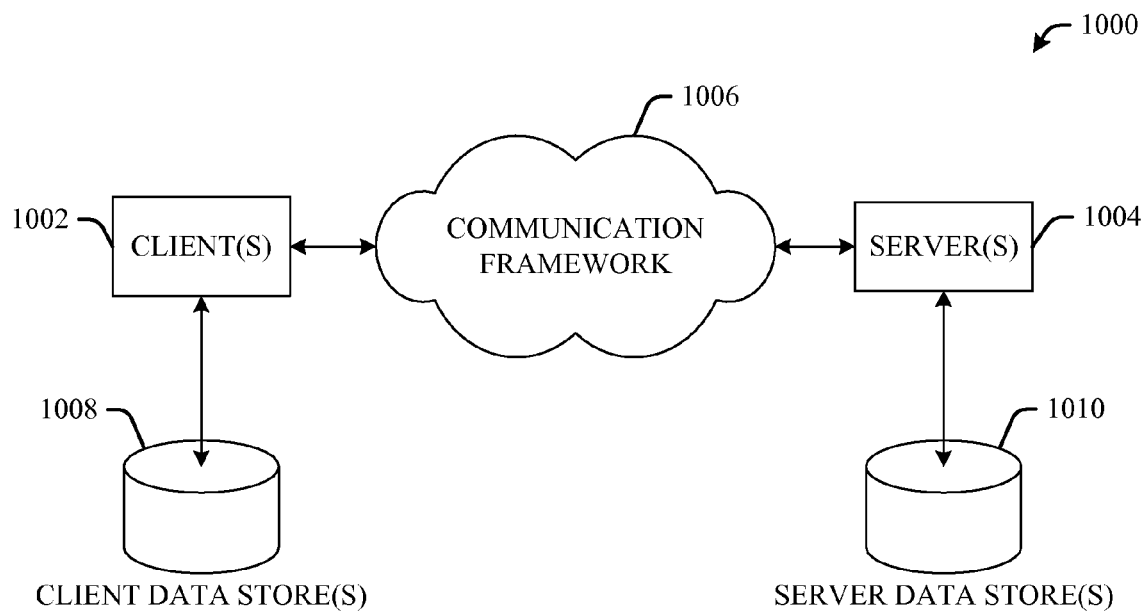
FIG. 10 illustrates a schematic block diagram of an exemplary computing environment in accordance with the subject specification.

Referring now to FIG. 10, there is illustrated a schematic block diagram of a computing environment 1000 that can be employed to provide DDEX default object implementations, in accordance with the subject specification. The system 1000 includes one or more client(s) 1002. The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware and/or software (e.g., threads, processes, computing devices). The servers 1004 can house threads to perform transformations by employing the specification, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method implemented within a computer system that includes at least one processor and memory storing instructions which, when executed by the at least one processor, implement the method for determining an implementation for a Data Designer Extensibility (DDEX) support entity, the method comprising:
- a computer system, which includes at least one processor, receiving a request from a client for an instance of a DDEX support entity, the DDEX support entity corresponding to a DDEX support entity definition that includes:
- an interface that represents a contract between clients calling the DDEX support entity and any implementations of the interface, wherein the contract comprises one or more method definitions that define one or more tasks performed by the DDEX support entity, the one or more method definitions implemented by the implementations of the interface; and
- metadata comprising i) an attribute that indicates the existence of a default implementation for the DDEX support entity and ii) an identifier that uniquely identifies the default implementation;
- the computer system querying a first DDEX provider for a provider-specific implementation for the DDEX support entity;
- in response to the query, the computer system determining that the first DDEX provider lacks the provider-specific implementation for the DDEX support entity;
- the computer system determining that the metadata includes the attribute that indicates the existence of the default implementation for the DDEX support entity;
- the computer system using the identifier to look up the default implementation;
- the computer system instantiating an instance of the default implementation; and
- the computer system returning the instance of the default implementation to the client.

2. The method of claim 1, further comprising:
- the computer system querying at least a second DDEX provider for a second provider-specific implementation for the DDEX support entity; and
- the computer system determining that the second DDEX provider lacks the second provider-specific implementation for the DDEX support entity.

3. The method of claim 2, wherein the one or more method definitions comprise input and/or output parameters associated with the one or more tasks.

4. The method of claim 1, wherein the default implementation comprises a class that implements the interface and wherein the identifier identifies the class.

5. The method of claim 4, wherein instantiating an instance of the default implementation comprises instantiating an instance of the class identified by the identifier.

6. The method of claim 4, wherein the class comprises a managed class.

7. The method of claim 1, wherein the default implementation is registered with a software development program and wherein the identifier specifies a unique value that identifies the registered default implementation.

8. The method of claim 7, wherein the identifier comprises a Globally Unique Identifier (GUID).

9. The method of claim 8, further comprising:
- the computer system defining the DDEX support entity definition.

10. The method of claim 9, further comprising:
- the computer system generating the Globally Unique Identifier (GUID); and
- the computer system registering the default implementation with the software development program, wherein the GUID identifies the registered default implementation.

11. The method of claim 1, wherein the attribute is in the form of '[DataDefaultObject("identifier")]', in which "identifier" specifies the identifier.

12. The method of claim 1, wherein the first DDEX provider corresponds to a data source.

13. A computer system for implementing a method for determining an implementation for a Data Designer Extensibility (DDEX) support entity, the computer system comprising:
- at least one processor; and
- one or more computer storage media having stored thereon computer executable instructions that, when executed by the at least one processor, implement the method, comprising:
- the computer system receiving a request from a client for an instance of a DDEX support entity, the DDEX support entity corresponding to a DDEX support entity definition that includes:
- an interface that represents a contract between clients calling the DDEX support entity and any implementations of the interface, wherein the contract comprises one or more method definitions that define one or more tasks performed by the DDEX support entity, the one or more method definitions implemented by the implementations of the interface; and
- metadata comprising i) an attribute that indicates the existence of a default implementation for the DDEX support entity and ii) an identifier that uniquely identifies the default implementation;
- the computer system querying a first DDEX provider for a provider-specific implementation for the DDEX support entity;
- in response to the query, the computer system determining that the first DDEX provider lacks the provider-specific implementation for the DDEX support entity;
- the computer system determining that the metadata includes the attribute that indicates the existence of the default implementation for the DDEX support entity;
- the computer system using the identifier to look up the default implementation;
  - the computer system instantiating an instance of the default implementation; and the computer system returning the instance of the default implementation to the client.

14. One or more computer storage media having stored thereon computer executable instructions that, when executed by at least one processor of a computer system, implement a method for determining an implementation for a Data Designer Extensibility (DDEX) support entity, the method comprising:
- a computer system, which includes at least one processor, receiving a request from a client for an instance of a DDEX support entity, the DDEX support entity corresponding to a DDEX support entity definition that includes:
- an interface that represents a contract between clients calling the DDEX support entity and any implementations of the interface, wherein the contract comprises one or more method definitions that define one or more tasks performed by the DDEX support entity, the one or more method definitions implemented by the implementations of the interface; and metadata comprising i) an attribute that indicates the existence of a default implementation for the DDEX support entity and ii) an identifier that uniquely identifies the default implementation;

the computer system querying a first DDEX provider for a provider-specific implementation for the DDEX support entity;

in response to the query, the computer system determining that the first DDEX provider lacks the provider-specific implementation for the DDEX support entity;

the computer system determining that the metadata includes the attribute that indicates the existence of the default implementation for the DDEX support entity;

the computer system using the identifier to look up the default implementation;

the computer system instantiating an instance of the default implementation; and the computer system returning the instance of the default implementation to the client.

* * * * *